(12) United States Patent
Van Den Bergen

(10) Patent No.: US 6,984,717 B2
(45) Date of Patent: Jan. 10, 2006

(54) PHOSPHOROUS CONTAINING MATERIALS, THEIR PREPARATION AND USE

(75) Inventor: Hugues Van Den Bergen, Brussels (BE)

(73) Assignee: Surface Specialties, S.A., Brussels (BE)

( * ) Notice: Subject to any disclaimer, the term of this patent is extended or adjusted under 35 U.S.C. 154(b) by 28 days.

(21) Appl. No.: 10/471,020

(22) PCT Filed: Mar. 5, 2002

(86) PCT No.: PCT/EP02/02390

§ 371 (c)(1),
(2), (4) Date: Feb. 10, 2004

(87) PCT Pub. No.: WO02/070587

PCT Pub. Date: Sep. 12, 2002

(65) Prior Publication Data

US 2004/0116651 A1    Jun. 17, 2004

(30) Foreign Application Priority Data

Mar. 7, 2001    (EP) .................................. 01105713

(51) Int. Cl.
*C08G 79/02*    (2006.01)

(52) U.S. Cl. ...................... 528/400; 528/398; 528/486; 528/489; 528/501; 528/502 R

(58) Field of Classification Search ................ 528/398, 528/486, 489, 501, 502 R, 400
See application file for complete search history.

(56) References Cited

U.S. PATENT DOCUMENTS 5,650,531 A    7/1997    Chang et al.

FOREIGN PATENT DOCUMENTS

| EP | 0 510 743 A | 10/1992 |
|---|---|---|
| GB | 1 575 157 A | 9/1980 |

*Primary Examiner*—Duc Truong
(74) *Attorney, Agent, or Firm*—Wenderoth, Lind & Ponack, L.L.P.

(57) ABSTRACT

The present invention is directed towards phosphorous containing organic materials, processes for making them and uses thereof. These materials preferably impart and/or exhibit resistance to attack, for example they may be useful as flame retardant additives and/or materials. The materials are especially radiation-curable polyester polymers. The phosphorous component used has at least one P—C bond resistant to hydrolysis or transesterification. It can be bis(hydroxymethyl)isobutylphosphineoxide, bis(hydroxypropyl)isobutylphosphine oxide and trishydroxymethylphosphine oxide. In other embodiments, it is 9,10-dihydro-9-oxa-10-phosphaphenantrene-10-oxide.

11 Claims, No Drawings

PHOSPHOROUS CONTAINING MATERIALS, THEIR PREPARATION AND USE

The present invention is directed toward phosphorus containing organic materials, processes for making them and uses thereof. The materials of the invention may preferably impart and/or exhibit resistance to attack, for example they may be useful as flame retardant additives and/or materials.

There is a continuing need for new materials exhibiting an improved resistance to attack, for example improved flame retardants. Furthermore, there is a need for materials which, while possessing the above properties, are polymerisable, for example in the form of a coating, as a thin or thick layer. Polymerisation may be achieved by any suitable method. Preferred methods are thermal curing or irradiation, for example using ultraviolet radiation and/or ionising radiation, such as gamma rays, X-rays or an electron beam.

The use of phosphorus containing materials as flame retardants is well known. It is believed that in the presence of a flame source they act by, for example, forming phosphoric and polyphosphoric acids of low volatility which catalyse the decomposition of organic compounds to carbon (char) and water. Non volatile phosphorus containing compounds may also coat the char to protect it from further oxidation, and this may act as a physical barrier and/or reduce the permeability of the char. It is believed that in general the greater the phosphorus content of the material the better its flame resistance.

It will be appreciated that the desire for imparting improved flame resistance by incorporating an increasing phosphorus content must also be balanced by the corresponding reduction in the proportion of other components in the treated or modified material. The overall physicochemical and mechanical properties of the resultant material must be maintained within limits acceptable for its end use.

Many previous phosphorus containing flame retardants have been non-copolymerisable compounds and/or required additional halogenated compounds as additives to improve flame retardant properties. In conventional plastics, flame retardation of polymers has been achieved by the use of flame retardants as additives, which are physically blended as a mixture with the polymer. However, conventional flame retardant additives suffer from several drawbacks. Prior art additives modify the physical and mechanical properties of the polymer often in an undesirable or unpredictable way. There may also be compatibility problems with the additive and the polymer to which it is added. Additives can also be unacceptable for certain applications, especially for coatings, as they can migrate through the coating to the surface which can lead to blooming phenomena. Additives may also discolour the composition which is a particular issue for clear coatings. Furthermore the use of certain additives may not work well with radiation curable materials since the high concentration of additives could lead to incomplete curing because the additive absorbs radiation.

For all these reasons, co-polymerisable compounds containing phosphorus have been developed in which the phosphorus atom is linked to the backbone of a polymer precursor through a chemical reaction in which a covalent bond is formed. This method of incorporating phosphorus is advantageous because as the phosphorus moieties are permanently linked to the backbone of the resultant polymer, there is no blooming effect and there are no compatibility issues as can be the case when incorporating phosphorus containing additives. Use of phosphorus containing polymer precursors also has a reduced influence upon the physical and mechanical properties of the resultant polymer. For example solid flame retardant additives can undesirably increase the viscosity of a polymer to which they are added.

Polyester acrylates (PEA) and polyester urethane acrylates (PEUA) (together both also referred to as polyester acrylates) represent an important polymer class of radiation curable polymer as they are often used as polymer precursors to make polymer coatings (such as UV curable resins and UV curable powder coatings) for thermally sensitive substrates such as wood or MDF. Therefore it would be desirable to incorporate phosphorous in polyester acrylates to provide these polymers with intrinsic flame retardant properties, particularly as safety regulations become more stringent.

However the oxyphosphorus groups previously used to incorporate phosphorous in polymers to impart flame resistance are sensitive toward hydrolysis and a transesterification reaction at a oxyphosphorous group (P—O bond) such as in a phosphate or phosphonate group. Moreover in the case of hydrolysis the mechanism is mostly irreversible. Indeed it is well known that direct esterification of any of the phosphoric acids is difficult. For example it is not feasible to prepare a trialkyl phosphate by heating $H_3PO_4$ with an alcohol as the reaction is sluggish and requires high temperatures for lengthy periods (for example see page 33 of "The Chemistry and Uses of Fire Retardants", John W; Lyons, Wiley-Interscience, 1970). This limits the way these phosphorous groups can be covalently bound to a polyester as a conventional esterification reaction which might be used to bind these derivatives to a polyester acrylate polymer cannot be used. The reaction involves acid catalysis which would also lead to transesterification side reactions at the oxyphosphorous group.

The applicant has demonstrated these side reactions by reacting prior art phosphorus containing polyols (e.g. those available commercially from Akzo Nobel under the trade name Fyrol 6) with acrylate esters. Even under the mild reaction conditions required for this reaction transesterification occurs preferentially at the phosphorus containing carbon followed by intramolecular cyclisation. This confirms that acrylation of prior art phosphorus containing polyols having phosphonate groups (which are supposed to be more resistant toward hydrolysis and/or transesterification reactions than phosphate groups) leads to a transesterification reaction. Thus prior art phosphorous containing polyols are not suitable derivatives for making phosphorus containing polyester acrylates.

Thus it would be desirable to find reagents having oxyphosphorus groups with a high resistance toward hydrolysis and/or transesterification reactions, to prepare the new and useful class of phosphorus containing polyester acrylate polymers.

The prior art will now be discussed:

J. Appl. Polym. Sci., 74(10), 2499–2509 by B I Wang, Ta-Zen: Chen, Kan-Nan at Department of Chemistry, Tamkang University, Tamsui 251, Taiwan describes how covalently bonded phosphorus was introduced into an aqueous-based polyurethane system using a postcuring reaction. Anionic aqueous based polyurethane (PU) dispersions were derived from a water dispersion process in which PU prepolymers having carboxylic groups were polymerised with neutralisation and chain extension. These PU prepolymers were prepared from a conventional polymerisation addition of isophorone diisocyanate, polypropylene glycol-1000, and dimethylolpropionic acid. Covalently bonded phosphorus was introduced into the PU by a phosphorus-containing curing agent. A series of phosphorus and multi-aziridinyl groups containing curing agents were synthesized for this purpose. Each of them served in a dual-function capacity as a postcuring agent for the anionic aqueous based PU system. The resulting postcured PU is stated to exhibit flame inhibiting properties due to the presence of nitrogen and phosphorus content. However in these polymers the phosphorous component is part of the crosslinker rather than the main polymer backbone.

JP 08199092 describes polyester resins for fire retardant powder coatings consisting of aromatic dicarboxylic acid component and aliphatic glycol component copolymerised with phosphorus containing compound.

JP 11293004 describes flame retardant polyester film made from polyester resin containing an aromatic dicarboxylic acid and a phosphorus compound. These resins are not copolymerisable by UV radiation.

WO 9942522 describes halogen-free flame retardant resin compositions comprising blends of polyester and red phosphorus powder for use in electrical and electronic components. These resins are not copolymerisable by UV radiation and phosphorus is used as additive (not covalently bound to the polymeric backbone).

There are certain reference describing resins with a phosphorus component grafted onto a polyester backbone.

For example EP 826712 describes polyesters derived from reactive phosphinic acid compounds.

DE 4344691 describes non UV copolymerisable polyethylene terephthalate polymers modified with phosphorus containing units in the polymer chain and phosphorus modified polyesters derived therefrom.

JP 07081015 describes a laminated polyester film having good transparency, electrostatic properties and adhesion. There is no mention that this polyester has flame retardant properties or is UV copolymerisable.

JP 63277233 discloses an aromatic copolyester for films, etc, with heat stability containing phosphorus containing aromatic diol, terephthalic acid, 4-hydroxybenzoic acid and acetic anhydride. This polyester is based on a phosphorous containing diol and is not UV-curable.

DE 3532865 discloses saturated hydroxylated polyesters containing acidic phosphoric acid ester groups used in combination with polyisocyanates, to form two-component polyurethane lacquers for paint. To extend their pot life these polyesters contain volatile tertiary amines or amides. These polymers are not UV curable.

DE 3200824 describes a fire retardant PVC coated polyester web made from polyester with integral phosphorus containing fire resistant modifier and PVC coating and plasticiser and antimony oxide. This is not UV copolymerisable.

U.S. Pat. No. 4,315,969 describes a phosphorus containing polyester which is not copolymerisable.

U.S. Pat. No. 4,259,222 describes a non copolymerisable linear, saturated polyester containing phosphorus and halogen by reacting phosphoric acid with halogenated aromatic ether diols.

There are some references which describe blends of polyester with phosphorus derivatives (not covalently bound thereto).

EP 0305745 describes a flame retardant unsaturated polyester composition containing a nitrogen-phosphorus component, ammonium polyphosphate and aluminium oxide. This blend of phosphorus derivatives with polyester is not UV copolymerisable.

JP 03281670 describes a flame retardant modification of UV curable resins with monomers containing bromine and phosphorus. An oligomeric acrylate ester and polyurethane acrylate are effectively retarded with vinyl-type flame-retardant monomers containing both Br and P.

Journal of Applied Polymer Science, Vol. 72, 109–122 (1999), "Synthesis and characterisation of copolyesters containing the phosphorus linking pendent groups" Shinn-Jen Chang, Fen-Chih Chang and U.S. Pat. No. 5,650,531 are two related references which both describe a highly pendant phosphorus-containing reactive polyester copolymer. These oligomers are synthesised by first esterifying diols, unsaturated double bond-containing dicarboxylic acids or acid anhydrides and saturated dicarboxylic acids or acid anhydrides to form a phosphorus free oligomeric unsaturated polyester. The phosphorus-containing reactive polyester oligomer is then formed by grafting a phosphorus-containing compound of formula:

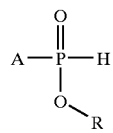

(where A is —R or OR and R is a $C_{1-10}$ alkyl group or a substituted or unsubstituted phenyl group) onto the oligomeric unsaturated polyester through addition reaction preferably in the presence of a selected metal complex catalyst such as $H_2PtCl_6$.

However this reference does not appreciate the problem of side reactions such as esterification and hydrolysis which can occur when incorporating such phosphorus-containing groups in a polyester. Phosphorous compounds where A is OR would not produce oligomers as described in this patent as with two OR groups at the P centre, the group would hydrolyse under the reaction conditions described. Indeed no examples or characterisation data (such as $^{31}$P NMR data) is given in this patent to indicate that such oligomers were in fact prepared with the claimed structure where A is OR. Even compounds mono substituted by OR (when A is R) are still prone to irreversible hydrolysis because the P—OR group is not stabilised (e.g. by forming part of a ring). The described process therefore does not work as suggested and well as having other disadvantages such as the use of an expensive platinum catalyst and a multiple step synthesis.

So this reference teaches away form the present invention which uses a single step process from readily available inexpensive starting materials and/or catalysts to produce reactive polyester oligomers of a different structure (the First Polymers of the present invention) where the phosphorous can be introduced at any point in the polymer chain.

Polymer 40 (1999) 4387–4398: "Synthesis and properties of phosphorus containing polyarylates derived from 2-(6-oxido-6H-dibenz<c,e><1,2>oxaphosphorin-6-yl) 1,4-dihydroxyphenylene" Wang Chun Shan, Lin Ching Hsuan: describes a polyester synthesised from a phosphorous compound obtained by reaction of 9,10-dihydro-9-oxa-10-phosphaphenantrene-10-oxide (also referred to herein as "DOPO") with benzoquinone: Acrylation of these polyesters is not described.

European polymer Journal 35 (1999) 1465–1472 "Phosphorus containing PET and PEN by direct esterification" C. S. Wang, J. Y. Shieh, Y. M. Sun disclose synthesis of copolyesters based on DOPO and itaconic acid monomers.

The following references describe phosphorus containing glycidyl ethers but these polymers are not acrylated:

Journal of Polymer Research Vol. 5, n°2, 59–65, April 1998 "Synthesis, characterisation, Thermal and Flame retardant properties of Novel Aryl phosphinate diglycidyl ether cured with anhydride", Ching-Sheng Cho et al Polymer vol. 39 n° 23 (1998) "Synthesis and properties of epoxy resins containing 2-(6-oxido-6H-dibenz<c,e><1,2>oxaphosphorin-6-yl)1,4-benzene diol" Chun-Shan Wand, J. Y. Shieh.

Journal of Applied polymer Science, vol., 73, 353–361 (1999), "Phosphorus-containing epoxy resin for electronic application" Chun-Shan Wang, Jeng-Yueh Shieh.

Thus the prior art describes polyester containing phosphorus or blends of polyester acrylates with non radiation curable phosphorus additives but does not disclose polyester acrylates which containing phosphorus. Flame retardant acrylated polyesters which are curable under UV/EB are unknown. The prior art monomers used previously to introduce phosphorous into polyester copolymers have various disadvantages as for example they are susceptible to hydrolysis and/or transesterification. Thus introducing (meth)acrylate by direct esterification or by transesterification to get a UV copolymerisable polyester(meth)acrylate is difficult. Moreover prior art processes use expensive catalysts such as $H_2PtCl_6$, require multiple steps and/or can only introduce phosphorous groups into a polymer when they are pendant from the main polymer backbone.

Thus there is an ongoing need to find improved means for introducing phosphorous into organic materials to produce materials with improved properties effective for the uses and/or applications described herein and which are capable of being produced on an industrial scale economically. A demand exists for a simple and economical process for the preparation of compounds which comprise phosphorus atoms and which can be used as starting material in the preparation of more complex compounds exhibiting useful properties for the applications and/or uses described herein (preferably for use in flame-retardancy).

It is an object of the invention to provide improved phosphorous containing materials which solve some or all of the problems described herein for the prior art.

The applicant has developed new improved phosphorous containing materials which exhibit utility in the applications described herein, for example having improved flame retardant properties and that are radiation curable. The applicant has also discovered improved processes for preparing such materials which address some or all of the problems of the prior art such as those described herein.

The use of a halogen containing monomer to prepare a flame retardant composition is undesirable. In a fire halogen groups can generate toxic and corrosive combustion products. These corrosive gases, in addition to their toxic properties, cause significant damage to electronic components, present in particular in computers, which very often results in the loss of essential data and irreparable damage, often worse than the fire itself. The combustion products from halogen containing materials may even be as dangerous as combustion products from materials untreated with flame retardants. It is also undesirable to use halogen compounds for other reasons such as their potentially undesirable effect on the environment. Therefore preferably the polymers of the invention are substantially free of halogen.

The applicant has now prepared in a single step ("First Process") certain phosphorus containing acrylatable (e.g. hydroxy and/or carboxy terminated) reactive oligomers ("First Polymer"). These First Polymers can be used in a Second Process to prepare (as a "Second Polymer") a new class of phosphorous containing polyesters such as polyester acrylates and/or polyester urethane acrylates. This because the plurality of acrylatable functional groups in the First Polymer (for example two of more hydroxy groups if the First Polymer is OH terminated) can be acrylated without hydrolysis or transesterification side reactions at the oxyphosphorous bond. The Second Polymers can be used in a further (Third) process to form Third Polymers (such as polymerised cross-linked polymer networks) useful for example as coatings. Optionally the Third Process is performed in situ on for example an article coated with one or more Second Polymers.

Certain polyfunctional reagents described herein (components (i) to (iv) see below) react in a single pot polycondensation (First Process) to form a First Polymer.

The First Polymer is reacted with at least one acrylating agent to form a radiation-curable polymer precursor ("Second Polymer"). The term "acrylating agent" is used herein to refer to a compound comprising a) one or more optionally alkylated acrylate group(s), for example (meth)acrylate; one or more alkyl(alkyl)acrylate ester(s), for example alkyl (meth)acrylate ester, preferably methyl(meth)acrylate ester and/or ethyl(meth)acrylate ester which can react with said reagent by a transesterification reaction.

The First Polymer can also be reacted with one or more oxiranating and/or isocyatating agent. The term "oxiranating agent" is used herein to refer to a compound comprising one or more oxiranyl group(s), for example oxirane(s) such as epoxides and/or oxetanes. The term "isocyanating agent" is used herein to refer to a compound comprising one or more isocyanate groups, e.g. —N=C=O. Collectively species which are (alkyl)acrylatable, oxiranatable and isocyanatable can be referred to herein as "reactive" as the context dictates.

The First Polymers may be represented schematically by the following general structure (which is by way of illustration only as should not be considered as limiting to scope of the invention):

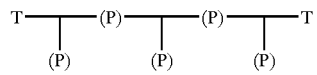

where T represents the (at least two) reactive groups such as hydroxy and/or carboxy and (P) denotes phosphorus groups which at any position on the polymer such as may be pendant from and/or incorporated into the main polymer chain (polymer backbone). The First Polymer is preferably a phosphorus-containing reactive polyester oligomer which may be dihydroxy or dicarboxy terminated.

The First Polymer can be reacted with many reagents (Second Reagents) in a Second Process to form a Second Polymer.

To form a Second Polymer of an acrylate urethane ester, the Second Reagents may comprise monoisocyanates, for example isocyanatealkyl(alkyl)acrylates, such as:

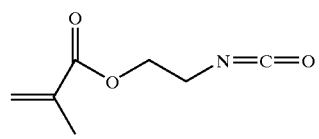

2-isocyanatoethyl methacrylate; and/or

-continued

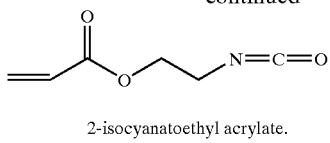

2-isocyanatoethyl acrylate.

To form a Second Polymer of an acrylate ester the Second Reagents may comprise (alkyl)acryloyl groups for example:

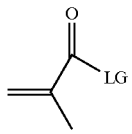 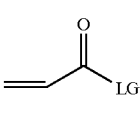

methacryloyl derivatives   and/or   acryloyl derivatives;

where in both the preceding formulae LG denotes a leaving group under the conditions of the Second Process such as halogen group (e.g. Cl).

To form a Second Polymer of a urethane acrylate and/or of a polyurethane acrylate dispersed and/or diluted in water, the Second Reagent(s) may comprise a plurality of (preferably two) isocyanate groups (i.e. comprise polyisocyanates).

To form a Second Polymer of a UV curable powder composition the Second Reagent(s) may comprise glycidyl (meth)acrylate groups.

In a preferred Second Process the First Polymer can be preferably (meth)acrylated or transesterified with (alkyl) (meth)acrylate esters to form a preferred Second Polymer which may be represented schematically by for example the following structure (which is by way of illustration only as should not be considered limiting to the scope of the invention):

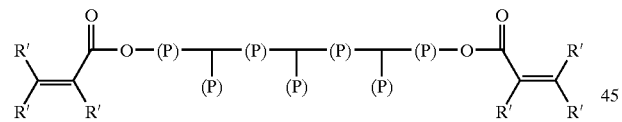

where independently each R' is typically H or alkyl such as methyl.

The Second Polymers comprise a new class of phosphorus containing polyester and/or urethane acrylates which can themselves be polymer precursor(s).

The Second Polymer can be further reacted with many reagents (Third Reagents) in a Third Process to form a Third Polymer.

The Second Polymer can also be used as the starting material in a Third Process of polymerisation (e.g. initiated by radiation) to form, as a Third Polymer, a phosphorus-containing polyester derived polymer. For example the Third Polymer may comprise the polymerisation product of a UV curable polyester acrylate or urethane acrylate after UV irradiation. The Third Process may optionally be carried out in situ (for example by UV irradiation of an article coated with a powder composition comprising the Second Polymer) to form as the Third Polymer for example a coating of a cross-linked polymeric network. Because such coatings contain phosphorous they may impart flame retardant properties to the coated article.

First Process

Therefore broadly in accordance with one aspect of the present invention there is provided a First Process for preparing a phosphorus-containing polymer precursor which polymer precursor is a radiation-curable polyester, the process comprising the steps of (a) mixing together:
 (i) a compound containing at least one hydrocarbylidenically unsaturated group and a plurality of carbonyloxy groups;
 (ii) optionally a compound having a plurality of carbonyloxy groups and optionally free of hydrocarbylidenically unsaturated groups,
 (iii) a polyol, and
 (iv) an oxyphosphorous-containing compound (component (iv)) in which the phosphorous atom has at least one P—C bond which is resistant to hydrolysis or transesterification under the reaction conditions herein; such component (iv) comprising compounds of formula (I) and/or (II) and/or effective isomers, salts and mixtures thereof:

$$R^1 R^2 R^3 P=O \tag{I}$$

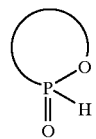

where,
 in formula (I): at least $R^1$ and $R^2$ independently represents $C_{1-20}$organo group substituted by one or more hydroxy and/or carboxy group; $R^3$ represents H or optionally substituted $C_{1-20}$organo group;
 in formula (II): the phosphorous atom is substituted with at least one carbon atom to form at least one P—C bond; the P—O bond forms part of an organo ring, the ring being optionally substituted with one or more organo groups and/or optionally fused to one or more other organo rings;

(b) initiating polymerisation of the mixture to form a hydroxy and/or carboxy terminated phosphorous containing polyester oligomer ("First Polymer"), Preferably steps (a) and (b) are carried out in a single vessel, more preferably are simultaneous.

Preferably in step (b) the polymerisation is polycondensation. A catalyst component (v) may be present during step (a). If present, it is other than one selected from $PtCl_4$, $NiCl_4$, $PdCl_4$, platinium divinyl tetramethyldisiloxane, platinium cyclovinyl methyl siloxane and mixtures thereof.

Preferably, a catalyst is present during step (a) which catalyst (component (v)) comprises a tin complex catalyst.

In addition to the components (i) to (v) above an additional ingredient [component (vi)] may also be added containing an ionic group or ionisable group (under the conditions of the reaction) which acts to improve the aqueous dispersiblity of some or all of the components in the reaction medium (as for example water may be a product of the polycondensation). Preferably component (vi) is selected from one or more of: sulphoisophtahlic acid, isomers and/or salts thereof (preferably the sodium or lithium salt of 5-sulphoisophtahlic acid, the sodium salt thereof also referred to herein as SSIPA); dimethylolpropionoic acid (also referred to herein as DMPA) and/or any effective mixtures thereof.

Component (a)(i)

Preferably in step (a) of the First Process component (i) comprises a double bond-containing unsaturated dicarboxylic acid, acid anhydride; ester; other condensable derivatives thereof; and/or suitable mixtures thereof.

More preferably component (i) comprises those compounds of Formula 1

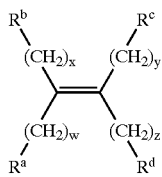

Formula 1 where w, x, y and z independently represent 0 or 1;

at least two of $R^a$ to $R^d$ comprise a monovalent carboxy group or together comprise a divalent carbonyloxycarbonyl group; the remaining groups $R^a$ to $R^d$ independently representing H or optionally substituted $C_{1-15}$hydrocarbyl; and/or effective isomers, esters and/or salts thereof.

Most preferred compounds of Formula 1 are those where either w, x, y and z are all 0 or one of w, x, y and z is 1 the rest being 0;

where the at least two of $R^a$ to $R^d$ which comprise a monovalent carboxy group or together comprise a divalent carbonyloxycarbonyl group is adjacent the methylene group;

the remaining groups $R^a$ to $R^d$ independently representing H or $C_{1-15}$hydrocarbyl; and/or effective isomers, esters and/or salts thereof.

Component (i) may usefully comprise at least one unsaturated diacid and/or anhydride selected from

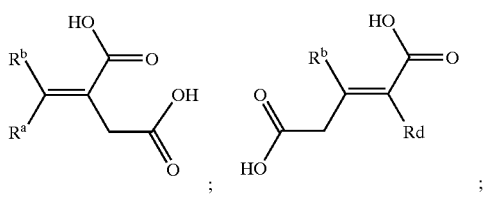

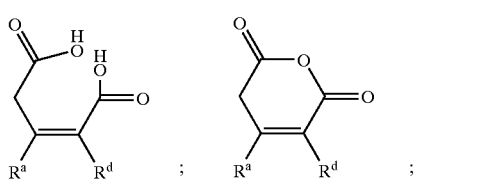

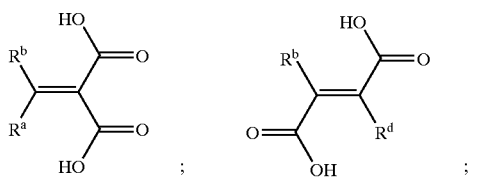

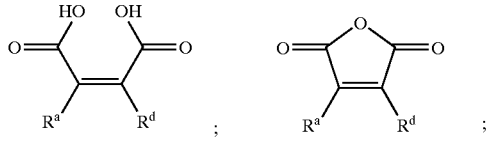

-continued in which $R^a$, $R^b$, $R^c$ and/or $R^d$ independently represent as appropriate H or $C_{1-15}$hydrocarbyl;

and/or effective isomers, (alkyl)esters and/or salts thereof.

Specific unsaturated diacids and/or anhydrides which may comprise component (i) are:

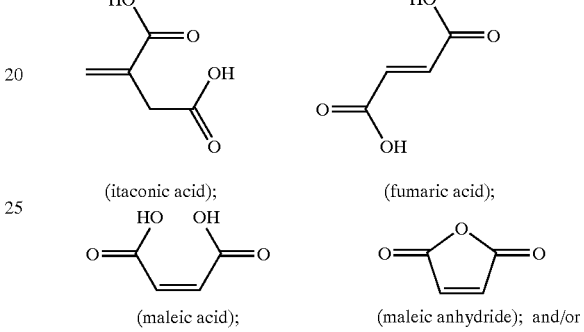

(itaconic acid); (fumaric acid);

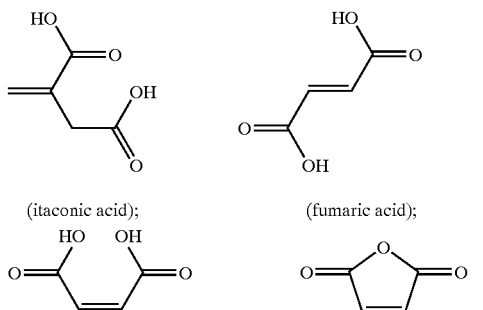

(maleic acid); (maleic anhydride); and/or effective isomers, (alkyl)esters and/or salts thereof.

To inhibit the self-polymerisation of component (i) (e.g. unsaturated dicarboxylic acids; anhydrides and/or their ester derivatives) it is preferred to add a double bond polymerisation inhibitor, for example, a quinone, such as hydroquinone, butyl quinone, dibutyl hydroquinone, methyl hydroquinone, during the First Process (e.g. polycondensation/esterification reaction) of the present invention. The amount of the inhibitors added is preferably from about 500 ppm to about 3000 ppm based on the total amounts of ingredients in the reaction mixture.

Component (a)(ii)

Preferably in step (a) the optional component (ii) comprises a unsaturated or saturated dicarboxylic acid or an acid anhydride thereof. Most preferably component (ii) is saturated. Examples of saturated dicarboxylic acids, esters or anhydrides that may comprise component (ii) herein are one or more of: adipic acid ($HOOC-(CH_2)_4-COOH$), sebacic acid, azelaic acid, docecane dicarboxylic acid, diesters of these acids, and/or effective mixtures thereof.

Component (a)(iii)

Preferably in step (a) component (iii) comprises an saturated diol. More preferably diols that may comprise component (iii) comprise one or more of: ethylene glycol, 1,4-butane diol, 1,6-hexanediol, diethylene glycol, neopenthylglycol, isomers, alkoxylated derivatives thereof (usefully oxypropylated and/or oxyethylated derivatives thereof) and/or effective mixtures thereof.

Component (a)(iv)

Conveniently in step (a) component (iv) (the oxyphosphorous containing compound) comprises a tertiary organosubstituted phosphorus atom (preferably comprising 3×P—C bonds thereon) or a secondary organo substituted phosphorus atom (preferably comprising 2×P—C bonds and one resistant oxyphosphorous bond (P—O) thereon).

A resistant oxyphosphorous bond denotes a P—O bond which does not hydrolyse and/or undergo transesterification under the conditions of the reaction (e.g. due to steric hindrance at the phosphorous and/or oxygen atom(s)) or where such hydrolysis and/or transesterification is readily reversible under the conditions of the reaction (e.g. where both the phosphorous and oxygen atoms of the P—O bond are ring atoms in a larger cyclic group).

More conveniently component (iv) comprises compounds of Formulae 1, 2, I, Ia, Ib, II, IIa, IIb, as described herein and/or effective isomers, salts and/or mixtures thereof.

Compounds of Formula 1 are represented by:

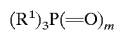

Formula 1 where m is 1;
the phosphorous atom is substituted directly with at least two carbon atoms to form at least two P—C bonds; each $R^1$ independently represents H or optionally substituted $C_{1-20}$organo;
at least two $R^1$ groups being optionally substituted with one or more hydroxy and/or carboxy; and/or
effective isomers, salts and/or mixtures thereof.

The same compounds can be defined more clearly as compounds of formula (I):

$$R^1 R^2 R^3 P{:=}O \qquad (I)$$

where at least $R^1$ and $R^2$ independently represents $C_{1-20}$organo group substituted by one or more hydroxy and/or carboxy group; $R^3$ represents H or optionally substituted $C_{1-20}$organo group.

Preferably each $R^1$ independently represents H or optionally substituted $C_{1-15}$hydrocarbo; more preferably H or optionally substituted $C_{1-12}$alkyl.

Preferred compounds of Formula I comprise those of Formulae Ia and/or Ib and/or effective isomers and/or salts thereof:

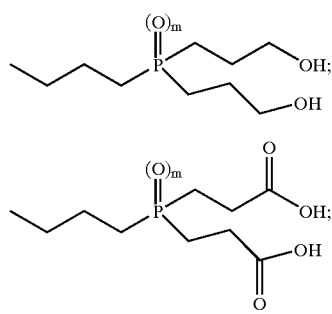

Formula Ia

Formula Ib where in each case m denotes 1.

Other preferred compounds are phosphine oxide available from CYTEC under the tradename Cyagard RF 1241 (Bis(hydroxymethyl)isobutylphosphine oxide, Cyagard RF 1243 (Bis(hydroxypropyl)isobutylphosphine oxide) and THMPO (trishydroxymethylphosphine oxide).

Phosphine oxide Cyagard RF 1243 is:

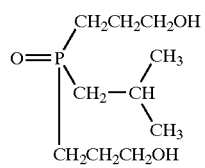

Tris(hydroxymethyl)phosphineoxide (THMPO) is:

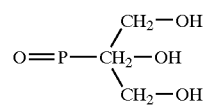

The phosphine oxide Cyagard RF 1241 is:

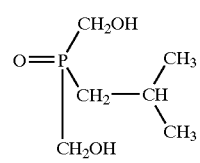

Other preferred compounds of formula (I) are phosphine oxide compounds bearing two carboxy groups such as, for example:

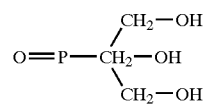

Compounds of Formula II are represented by:

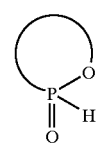

Formula (II)

where the phosphorous atom is substituted with at least one carbon atom to form at least one P—C bond;
the P—O bond forms part of a larger organo ring (denoted by the arc of a circle in Formula II), the ring being optionally substituted with one or more organo groups and/or optionally fused to one or more other organo rings: and/or
effective isomers, salts and/or mixtures thereof.

Preferred compounds of Formula II comprise compounds of Formula IIa

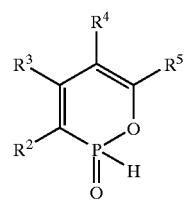

Formula IIa in which
$R^2$ to $R^5$ independently represent H or optionally substituted $C_{1-18}$organo group(s), a plurality of which may together represent one or more rings optionally fused to the oxyphosphorous ring to which they are attached; and/or effective isomers, salts and/or mixtures thereof.

More preferred compounds of Formula II comprise compounds of Formula 2.

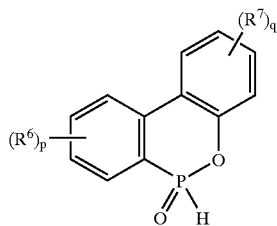

Formula 2 in which p and q independently represent 0 or an integer from 1 to 4; $R^6$ and $R^7$ independently in each case represent H or optionally substituted $C_{1-15}$hydrocarbo group(s) and/or optionally one or more rings (aromatic or non aromatic) fused to the benzene ring(s) to which they are attached; and/or effective isomers, salts and/or mixtures thereof.

A preferred compound of Formula II comprises that of Formula IIb:

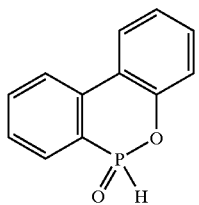

Formula IIb 9,10-dihydro-9-oxa-10-phosphaphenantrene-10-oxide (also referred to herein as "DOPO") and/or effective isomers, salts and/or mixtures thereof.

Component (a)(v)

Conveniently the optional catalyst, if present, may be substantially free of any of the following: $PtCl_4$, $NiCl_4$, $PdCl_4$ siloxanes of Pt, (especially platinum divinyl tetramethyldisiloxane and platinum cyclovinyl methyl siloxane); and/or mixtures thereof. More conveniently the catalyst is substantially free of platinum, palladium, nickel, complexes and/or salts thereof. Most conveniently the catalyst may be other than a metal complex represented by formula $MX_4$ or $H_2MX_6$ where M is a metal of Group 10 (IUPAC) of the periodic table (=Group VIIIA in Europe and VIIIB in USA) and X is a halogen or a group of S, O or Si.

Preferably the optional catalyst used as component (v) herein comprises a main group metal (i.e. non transitional metal), complex and/or salt thereof, more preferably a metal, complex and/or salt of Group 14 (IUPAC) of the periodic table (=Group IVB in Europe and IVA in USA); most preferably comprises tin metal, complex and/or salt, for example the tin complex available commercially from Goldschmidt under the trade name Fascat 4102.

The amount of the catalyst used may be from about 0.003% to about 0.05% percent by weight based on the total amount of the other components.

The First Process of the present invention for preparing the First Polymer has several advantages compared to known methods of preparing prior art phosphorus-containing reactive polyester oligomers. These advantages may include one or more of the following:

excellent yields (very few side reactions, so purification is unnecessary);

inexpensive catalyst such as tin are used: (compared to Group 10 catalysts used in the prior art); and/or phosphorous groups can be readily introduced in any region in the polymer e.g. pendant from the polymer chain and/or within the main polymer backbone.

First Polymers

Another aspect of the invention provides as the First Polymer of the invention a phosphorus-containing reactive polyester oligomer obtained and/or obtainable from the First Process of the invention as described herein.

The First Polymers are preferably reactive (i.e. (alkyl) acrylatable; oxiranatable and/or isocyanatable) in a Second Process to form as a Second Polymer of the invention a phosphorus-containing unsaturated polymerisable polymer (see below).

Preferably the First Polymer has a molecular weight ($M_n$ measured by GPC) less than about 5,000 daltons; more preferably from about 250 to about 4,000 daltons, most preferably from about 300 to about 3,000 daltons, for example from about 300 to about 2,000 daltons.

Preferably the First Polymer has a viscosity of from about 100 to about 70,000 mPa.s,. more preferably from about 1000 to about 50,000 mPa.s, most preferably from about 10,000 to about 40,000 mPa.s. The viscosity values quoted herein are Hoppler viscosities measured at 60° C.

Preferably the First Polymer has a phosphorus content of from about 0.5% to about 10.0%; more preferably from about 2.0% to about 8.0%; most preferably from about 4.0% to about 7.0% by mass of the First Polymer.

Preferably the First Polymer has a polydispersity of at least about 1.1, more preferably from about 1.2 to about 4.0 and most preferably from about 1.5 to about 3.5.

Where the First Polymer comprises a plurality of hydroxy groups it may be used as the polyol component for the preparation of phosphorous containing urethane acrylate polymers. This method has several advantages over known methods for preparing urethane acrylates from phosphorus-containing polyols (such as described in WO 9502004 [DSM]), and such advantages may include one or more of those described herein.

The applicant's patent application WO 00/52016 (the contents of which are hereby incorporated by reference) describes polymer precursors formed by the reaction of an optionally substituted terminal phosphate or H-phosphonate ester with a compound comprising at least one oxiranyl, preferably epoxy, ring adjacent an alkylenylcarbonyloxy group. Therefore First Polymers of the present invention which comprise at least two hydroxy groups may also be copolymerised with the aforementioned polymer precursors described in WO 00/52016 to produce phosphorus containing polyurethanes copolymers which for example may have use as flame retardants, anti-corrosives, pigment dispersants and/or adhesion promoters.

However it is preferred that First Polymers are used as described herein in the Second Process of the present invention to form Second Polymers of the present invention (e.g. acrylated polyester polymer precursors).

The First Polymer comprises phosphorus moieties which may be pendant to or part of the main polymer chain and thus also may be pendant to or part of the main polymer chains in the Second and Third Polymers derived therefrom. This has the advantage that a phosphorous to carbon bond which is resistant to hydrolysis and oxidation can be introduced into polymers to modify and/or alter the physico-chemical and mechanical properties of the phosphorus containing polymers of the invention.

If the First Polymer is substantially free of P—O single bonds (for example if component (iv) in the First process comprises mainly compound(s) of Formulae 1, I Ia, Ib) then the First Polymer (and in Second and Third Polymers derived therefrom) has a high hydrolysis and/or oxidation resistance due to the incorporation of strong P—C bonds in the polymer backbone and scission thereof is very difficult.

If the First Polymer comprises a P—O single bond (for example if component (iv) in the First process comprises one or more compound(s) of Formulae 2, II, IIa, IIb) then preferably the P—O bond is not incorporated into the main polymer backbone (chain) of the First Polymer so hydrolysis of the P—O bond thereon does not lead to scission of the main polymer chain of the First Polymer (and Second and Third Polymers derived therefrom). If hydrolysis and/or transesterification occurs at the P—O bond on the First Polymer (and in Second and Third Polymers derived therefrom) this is reversible where for example the P—O bond forms part of a larger ring structure.

Second Process

The First Polymer is reacted, in a step (c), with at least one acrylating agent to form a radiation-curable polymer precursor ("Second Polymer").

Therefore broadly in a further aspect of the present invention there is provided as the Second Process of the invention a process for preparing a phosphorus containing polymer precursor (also referred to herein as the Second Polymer), the process comprising the step of reacting a First Polymer of the present invention as described herein, with at least one reagent (also referred to herein as the Second Reagent) comprising one or more (meth)acrylate, oxiranyl and/or isocyanate group(s).

Preferably the Second Reagent comprises an acrylate and/or oxiranyl group. More preferred Second Reagents are selected from: (meth)acrylic acids: (meth)acrylate (alkyl) esters;, oxiranyloxy containing compounds; and most preferably from: (meth)acrylic acid and/or glycidyl(meth)acrylates.

More preferably the Second Process relates to the preparation of a phosphorus-containing polymer precursor (the Second Polymer) by direct (meth)acrylation of a phosphorus-containing reactive polyester oligomer (the First Polymer).

Due to the high hydrolytic resistance in the Second Process of the phosphorous carbon chemical bond of the First Polymer it is possible to react the First Polymer with the Second Reagent to form the Second Polymer without hydrolysis or transesterification side reactions.

An alternative preferred Second Process of the invention comprises the steps of:
a) reacting the First Polymer with a polyisocyanate to form an oligomer (which is preferably terminated with an isocyanate (NCO) group) and
b) end capping any residual isocyanate groups with a suitable end capping reagent (such as hydroxy(alkyl) acrylate);

to form, as the Second Polymer, a urethane polymer (for example a urethane acrylate polymer).

Isocyanates may be used in the Second Process as co(polymer precursors) with the First Polymer, to form as a copolymer the Second Polymer.

Organic isocyanates which may be used to prepare polyurethane Second Polymers are preferably polyisocyanates (i.e. have two or more isocyanate groups per molecule), more preferably di- or tri-isocyanates. The isocyanates may be aliphatic, cycloaliphatic and/or aromatic. Examples of suitable isocyanates comprise any of those disclosed in WO 00/52016 (which is hereby incorporated by reference) and especially those described on page 17, line 14 to page 18 line 6 of this reference. The total quantity of organic (poly) isocyanates used to prepare Second Polymers may be from about 10% to about 60% by weight of the Second Polymer. If the Second Polymer comprises a phosphorous containing polyester urethane acrylate then the Second Process may be solvent free, preferably only reagents being used and optionally may also be free of any further purification, washing and/or isolation step(s) (work-up steps).

Because of their high content of oxyphosphorous groups the Second Polymers are hydrophillic and so preferably the Second Process of the invention does not comprise an aqueous washing step. Surprisingly it has been found that a washing step is not required in the Second Process.

Therefore a preferred aspect of the Second Process of the invention comprises a further step where the reaction product is neutralised with a weak or strong base (preferably strong base) and water is removed from the reaction mixture before the resultant product is isolated. More preferably the Second Process comprises a final work up step in which the reaction product is neutralised in situ with a strong base (such as aqueous sodium hydroxide) the water is removed by azeotropic distillation and the resultant product is collected by filtration. This work up results in significantly less (preferably substantially no) mass loss of the hydrophillic Second Polymer and thus much higher yields can be obtained.

The Second Process of the present invention (or preferred features thereof) have several advantages which may include one or more of the following:
a means is provided for obtaining a new class of useful phosphorous containing polymer precursors (the Second Polymers);
there is a substantial reduction in side reactions such as transesterification and/or hydrolysis of oxyphosphorous groups;
excellent yields are obtained as no washing is necessary; so there is little mass loss of the hydrophillic Second Polymer; and/or
the process is environment friendly as eliminating a washing step reduces waste products.

Second Polymers

Another aspect of the invention provides as the Second Polymer of the invention a phosphorus-containing polymer precursor obtained and/or obtainable from the Second Process of the invention as described herein.

The Second Polymers comprise phosphorus-containing polyesters with for example (meth)acrylate, oxiranyl and/or urethane groups and these can be considered as a novel class of polymer precursors.

Preferred Second Polymers comprise optionally substituted phosphorous containing polyester acrylates and optionally substituted phosphorous containing polyester urethane acrylates; more preferably phosphorous containing polyester alkyl(meth)acrylates.

The Second Polymers are phosphorus-containing polymer precursors with a high phosphorus content and can be used in the applications or uses described herein for example to confer useful properties to polymers. Thus the Second Polymers are particularly useful to prepare further polymers and/or compositions (such as the Third Polymers of the invention—see below) useful in at least one of the following applications: anti-corrosion, pigmentary dispersion; adhesion promotion and/or flame retardancy, especially flame retardancy. The Second Polymers may also have and/or impart such properties themselves.

Compositions comprising the Second Polymer can be cured in a very convenient way [e.g. by radiation (UV, EB) or thermal curing (with thermal initiators)] to generate a cross-linked network of polymer chains in situ (the Third Polymer) which form a coating and/or film of resin (such as polyurethane acrylate or polyester acrylate) which can be flame-retardant.

Preferably the Second Polymer has an average molecular weight ($M_n$) of from about 200 to about 5,000 daltons; more preferably from about 250 to about 4,000 daltons, most preferably 500 to about 3,000 daltons. Alternatively the Second Polymer may have a $M_n$ value of from about 1,000 to about 2,000 daltons. The $M_n$ value may be measured by any suitable technique such as GPC.

Preferably the Second Polymer has a phosphorus content of from about 0.5% to about 10.0%; more preferably from about 2.0% to about 7.0%; most preferably from about 3.0% to about 6.0% by mass of the Second Polymer.

Preferably the Second Polymer comprises optionally substituted phosphorous containing polyesters such as those selected from: polyester acrylates; polyester oxiranyl(alkyl) acrylates [more preferably polyester glycidyl(meth)acrylates]; polyester urethane acrylates; polyurethane dispersions (optionally cross-linkable and/or crosslinked); polyesters and/or optionally cross-linked and/or cross-linkable compositions, mixtures and/or networks thereof.

Preferably the Second Polymers comprises an average value for the number of repeat units per chain (denoted herein by "m") of from about 2 to about 100, most preferably from about 2 to about 50. Preferably the polymers of the invention comprise a mixture of polymer chains with a substantially Gausian distribution of chain lengths. Alternatively if m is 1, this represents a monomer.

Preferably the Second Polymer has a polydispersity of at least about 1.1, more preferably from about 1.2 to about 4.0 and most preferably from about 1.5 to about 3.5.

Third Process

A yet other aspect of the invention provides, as the Third Process of the Invention, a polymerisation method for preparing a phosphorus-containing polyester derived polymer (also referred to herein as the Third Polymer) in which the method comprises a step of initiating polymerisation in the presence of the Second Polymer of the present invention which may for example be used as a reagent, and/or co-monomer in combination with other ingredients such as (co)monomers, polymer precursors, catalysts, initiators (e.g. photo-initiators), cross-linkers and/or other additives (e.g. flame retardant additives).

Flame retardant additives may be added during the Third Process to improve the flame retardant properties of the cured polymer (Third Polymer of the invention) with the advantage that they can be added at much lower loading to achieve a given flame retardant effect because the Third Polymer already has flame retardant properties. As such additives (if used) will be present in lower amounts, this limits their corresponding drawbacks.

Examples of suitable flame retardant additives comprise one or more of the following and/or any compatible mixtures thereof:

phosphorous containing additives such as DOPO, red phosphorous, ammonium phosphates; ammonium polyphosphates, melamine phosphates (e.g. melamine pyrophosphate and/or melamine orthophosphate), aliphatic organophosphorous additives (e.g. triethylphosphate, tributylphosphate, trioctylphosphate, triphenylphosphate and/or dimethyl methylphosphonate); oligomeric phosphorous compounds; trimethylolpropane methylphosphonate oligomer, pentaerythritol phosphates and/or polyphosphazene derivatives;

inorganic hydroxides such as aluminium trihydroxide, magnesium hydroxide, brucite, hydromagnesite, aluminium phosphinates, mixed metal hydroxides and/or mixed metal hydroxycarbonates;

inorganic oxides such as magnesium oxide; and/or antimony trioxide;

silicone, silica and/or silicate derivatives; and/or other inorganic materials such as magnesium calcium carbonate, barium metaborate; zinc borate, zinc hydroxystannate; zinc stannate; zinc metaborate; expandable graphite; and/or blends of vitreous materials that act as a flame retardant barrier (such as that available from Ceepree under the trade name Ceepree 200).

The flame retardant additives may optionally be surface treated to improve their compatibility with the polymers to which they are added. For example inorganic hydroxides may be surface treated with long chain carboxylic acid(s) and/or silane(s) as described in "Fire Retardancy of Polymeric Materials", edited by Arthur F. Grand & Charles A. Wilkie; Marcel Dekker Inc (5000), pages 285 to 352.

In the Third Process initiation of polymerisation may be achieved by any suitable means well known to those skilled in the art. Examples of suitable methods comprise: thermal initiation; chemical initiation by adding suitable agents; catalysis; and/or initiation using an optional initiator followed by irradiation, for example with electromagnetic radiation (photo-chemical initiation) at a suitable wavelength such as UV; and/or with other types of radiation such as electron beams, alpha particles, neutrons and/or other particles. Radiation, especially UV or electron beam (EB) radiation is the preferred initiation means.

The Third Process of the present invention (or preferred features thereof) has several advantages which may include one or more of the following:

polymer coatings (Third Polymers) of novel structure and/or properties can be obtained; and/or the process is environment friendly as no solvent is required in the case of UV or EB curing.

Third Polymers

Another still further aspect of the invention provides as the Third Polymer of the invention a phosphorus-containing polyester derived polymer obtained and/or obtainable from the Third Process of the invention.

Preferably the Third Polymer of the invention comprises a resin which Is substantially cross-linked to form a network of linked polymer chains which may form for example a film or coating and may contain one or more pendant phosphorus moieties within the polymer chain or network.

A yet still other aspect of the invention provides an (optionally flame retardant) coating composition comprising a Third Polymer of the present invention. Preferably the coating is a powder coating. Alternatively (or as well) a coating composition of the present invention may comprise a Second Polymer of the invention for example if the Third Process (polymerisation) is to occur in situ after the coating has been applied to an article.

Compositions of the invention may also comprise other ingredient(s) such as a carrier or diluent, conventionally used to formulate a composition and/or product effective (e.g. as a flame retardant) in the use for which it is designed. If the carrier or diluent comprises a resin, the resin may be selected to optimise any suitable property such as hardness or durability.

Compositions of the invention can be applied to any type of substrate, such as, in particular, wood, textiles, paper and plastics, such as polyethylene and polypropylene. Such compositions can produce a coating which exhibits useful properties (such as flame retardancy) with good resistance to external conditions. The compositions of the invention can be used in applications such as, for example, plastic coating, electric wire/cable, electronic sleeves, paper and board, automotive applications, textile, fabric coatings, carpets . . . .

Articles coated with a coating comprising a Third Polymer of the present invention also form part of the present invention.

A still yet further aspect of the present invention provides a) a product; b) a component for said product; and/or c) a consumable for use with said product, which comprises at least one First Polymer, Second Polymer and/or Third Polymer of the present invention and has utility in one or more applications and/or uses described herein; preferably selected from at least one of flame retardancy, anti-corrosion, pigmentary dispersion and/or adhesion promotion; more preferably flame retardancy.

Another aspect of the present invention provides use of at least one First Polymer, Second Polymer and/or Third Polymer of present invention in the manufacture of a) an effective product of the invention, b) component for said product(s); and/or c) a consumable for use with said product(s).

Another aspect of the present invention is a polymer and/or process for preparing a polymer as described in any of the Examples 1 to 15 herein.

The terms 'optional substituent' and/or 'optionally substituted' as used herein (unless followed by a list of other substituents) signifies the one or more of following groups (or substitution by these groups): carboxy, sulpho, formyl, hydroxy, amino, imino, nitrilo, mercapto, cyano, nitro, methyl, methoxy and/or combinations thereof. These optional groups include all chemically possible combinations in the same moiety of a plurality (preferably two) of the aforementioned groups (e.g. amino and sulphonyl if directly attached to each other represent a sulphamoyl group). Preferred optional substituents comprise: carboxy, sulpho, hydroxy, amino, mercapto, cyano, methyl and/or methoxy.

The synonymous terms 'organic substituent' and "organic group" as used herein (also abbreviated herein to "organo") denote any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclic groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen and/or sulphur, more preferably from hydrogen, nitrogen, oxygen and/or sulphur.

Most preferred organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulphinyl, sulphonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group).

The term 'hydrocarbo group' as used herein is a sub-set of a organic group and denotes any univalent or multivalent moiety (optionally attached to one or more other moieties) which consists of one or more hydrogen atoms and one or more carbon atoms. Hydrocarbo groups may comprise one or more of the following groups. Hydrocarbyl groups comprise univalent groups formed by removing a hydrogen atom from a hydrocarbon. Hydrocarbylene groups comprise divalent groups formed by removing two hydrogen atoms from a hydrocarbon the free valencies of which are not engaged in a double bond. Hydrocarbylidene groups comprise divalent groups (represented by "$R_2C=$") formed by removing two hydrogen atoms from the same carbon atom of a hydrocarbon, the free valencies of which are engaged in a double bond; Hydrocarbylidyne groups comprise trivalent groups (represented by "$RC\equiv$"), formed by removing three hydrogen atoms from the same carbon atom of a hydrocarbon the free valencies of which are engaged in a triple bond. Hydrocarbo groups may also comprise saturated carbon to carbon single bonds; unsaturated double and/or triple carbon to carbon bonds (e.g. alkenyl, and/or alkynyl groups respectively) and/or aromatic groups (e.g. aryl) and where indicated may be substituted with other functional groups.

The term 'alkyl' or its equivalent (e.g. 'alk') as used herein may be readily replaced, where appropriate and unless the context clearly indicates otherwise, by terms encompassing any other hydrocarbo group such as those described herein.

Any substituent, group or moiety mentioned herein refers to a monovalent species unless otherwise stated or the context clearly indicates otherwise (e.g. an alkylene moiety may comprise a bivalent group linked to two other moieties). A group which comprises a chain of three or more atoms signifies a group in which the chain wholly or in part may be linear, branched and/or form a ring (including spiro and/or fused rings). The total number of certain atoms is specified for certain substituents for example $C_{1-r}$organo, signifies an organic group having from 1 to 'r' carbon atoms. In any of the formulae herein if one or more ring substituents are not indicated as attached to any particular atom on the ring, the substituent may replace any hydrogen atom attached to a ring atom and may be located at any available position on the ring which is chemically suitable.

Preferably any of organic groups listed above comprise from 1 to 36 carbon atoms, more preferably from 1 to 18. It is particularly preferred that the number of carbon atoms in an organic group is from 1 to 10 inclusive.

The term "polyol" is understood to mean a compound or polymer which comprises at least two hydroxy groups not bound to the same carbon.

The term oxirane is understood to mean a species comprising at least one oxiranyl radical (also referred to herein as an oxiranyl group). Oxiranyl radicals comprise a 3 to 6 membered saturated heterocyclic ring which contains one oxy group with a free carbon valence on the ring and/or a direct carbon bond from the ring to another organo moiety (e.g. where the oxiranyl group comprises part of a larger molecule).

Preferred oxiranyl radicals comprise epoxide radicals and/or oxetanyl radicals. An epoxide radical may be denoted by the general

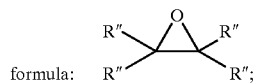

and an oxetanyl radical may be denoted by the general formula:

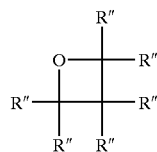

where independently in each case R" denotes H and/or an organo group, (preferably H and/or hydrocarbo) and at least one R" denotes a direct carbon bond to another moiety or a free carbon valence. Compounds comprising respectively epoxide and oxetanyl radicals may be referred to respectively as epoxide(s) and oxetane(s).

Oxiranes includes monooxiranes with one oxiranyl radical and polyoxiranes which comprise at least two oxiranyl radicals for example polyepoxides such as diepoxides and/or polyoxetanes. Oxiranes comprises species where the oxiranyl group is terminal or internal, preferably terminal.

As used herein chemical terms (other than IUAPC names for specifically identified compounds) which comprise features which are given in parentheses—such as (alkyl)acrylate, (meth)acrylate and/or (co)polymer—denote that that part in parentheses is optional as the context dictates, so for example the term (meth)acrylate denotes both methacrylate and acrylate.

Unless the context clearly indicates otherwise, as used herein plural forms of the terms herein are to be construed as including the singular form and vice versa.

The term "comprising" as used herein will be understood to mean that the list following is non-exhaustive and may or may not include any other additional suitable items, for example one or more further feature(s), component(s), ingredient(s) and/or substituent(s) as appropriate.

The term 'effective' (for example with reference to the process, uses, products, materials, compounds, monomers, oligomers, polymer precursors and/or polymers of the present invention) will be understood to denote utility in any one or more of the following uses and/or applications: anti-corrosion, pigmentary dispersion; adhesion promotion and/or flame retardancy, preferably flame retardancy. Such utility may be direct where the material has the required properties for the aforementioned uses and/or indirect where the material is used as a synthetic intermediate and/or diagnostic tool in preparing materials of direct utility. Preferred uses are those which are necessary to provide improved protection and/or resistance to flame and/or a source of heat and/or ignition. When referring to the effective materials of the present invention it is preferred that the term 'optionally substituted' does not include halo containing species. As used herein the term "suitable" denotes that a functional group is compatible with producing an effective product.

The substituents on the repeating unit may be selected to improve the compatibility of the materials with the polymers and/or resins in which they may be formulated and/or incorporated to form a flame retardant material. Thus, the size and length of the substituents may be selected to optimise the physical entanglement or interlocation with the resin or they may or may not comprise other reactive entities capable of chemically reacting and/or cross-linking with such other resins.

Certain moieties, species, groups, repeat units, compounds, oligomers, polymers, materials, mixtures, compositions and/or formulations which comprise some or all of the invention as described herein may exist as one or more stereoisomers (such as enantiomers, diastereoisomers and/or geometric isomers) tautomers, conformers, salts, zwitterions, complexes (such as chelates, clathrates, interstitial compounds, ligand complexes, organometallic complexes, non-stoichiometric complexes, solvates and/or hydrates); isotopically substituted forms, polymeric configurations [such as homo or copolymers, random, graft or block polymers, linear or branched polymers (e.g. star and/or side branched), cross-linked and/or networked polymers, polymers obtainable from di and/or tri-valent repeat units, dendrimers, polymers of different tacticity (e.g. isotactic, syndiotactic or atactic polymers)]; polymorphs (such as interstitial forms, crystalline forms and/or amorphous forms), different phases, solid solutions; combinations thereof and/or mixtures thereof. The present invention comprises all such forms which are effective.

The polymers of the present invention (First, Second and/or Third Polymers) may be prepared using one or more suitable polymer precursor(s) (including where appropriate polymers of the present invention) which may be organic and/or inorganic and comprise any suitable (co)monomer(s), (co)polymer(s) [including homopolymer(s)] and mixtures thereof which comprise suitable polymerisable functionality for example moieties which are capable of forming a bond with the or each polymer precursor(s) to provide chain extension and/or cross-linking with another of the or each polymer precursor(s) via direct bond(s) as indicated in the Formulae herein. The polymer precursor(s) may be substantially un-reactive at normal temperatures and pressures.

Preferably all the reagents, (and if required any optional solvents, catalysts and/or other materials) used in the processes of the invention are substantially free of halo (per se and/or as impurities) so that the First, Second and/or Third Polymers of the invention so obtained are also substantially free of halo, without any further purification steps being required.

EXAMPLES

The present invention will now be illustrated by the following, non-limiting Examples, in which the following conventional techniques were used: acid numbers were measured using American Standard method (ASTM) D 974-64; hydroxy (OH) numbers were measured using ASTM E 222-73; isocyanate (NCO) numbers were measured using ASTM D 2572-87; Hoppler viscosity (denoted herein by "H") was measured at 25° C. using DIN 53015; colour was measured using the Gardner method as described in ASTM 1544-68;; and phosphorus content was calculated as the percentage mass of phosphorus atoms compared to the total mass of the relevant product as the context dictates (denoted herein by P wt %).

Examples 1 to 5

The First Process and First Polymers of the present invention will now be illustrated. A generic First Process for preparing a phosphorus containing reactive (polyhydroxy terminated) polyester oligomer (=First Polymer) is now described To a 4 liter reactor vessel having a heating jacket and equipped with a stirrer, were added: 'a' g of the diol 'b'; 'c' g of the diacid 'd'; 'e' g of 2-methenyl-1,4-butandioic acid (itaconic acid); 'f' g of 9,10-dihydro-9-oxa-10-phosphaphenantrene-10-oxide (also referred to herein as DOPO and available commercially from Schill & Seilacher under the trade name Struktol Polydis 3710); 2.0 g of 1,4 dihydroxybenzene (hydroquinone, an anti-oxidant); and 1.2 g of the tin catalyst available commercially from Goldschmidt under the trade name Fascat 4102. The reaction mixture was stirred and heated to 110° C. under a stream of nitrogen at a flow rate of 5 liters per hour. The mixture was held at this temperature for 4 hours and then heated to 180° C. until no more water distilled ('g' g of water produced from the esterification reaction was collected). When the acid value reduced to less than 10 mg KOH/g, the reaction mixture was heated at 180° C. under reduced pressure vacuum for 8 hours to remove residual water. The mixture was cooled at room temperature until $^{31}$P-NMR analysis confirmed that the addition of DOPO onto the unsaturated bonds of itaconic acid was complete (i.e. no free DOPO was detected) to give as product a phosphorous-containing polyester acrylate polymer with the following properties: Phosphorus content of 'h'% w/w; acid value ($I_{AC}$) of 'i' mg KOH/g; and hydroxy value ($I_{OH}$) of 'j' mg KOH/g.

In the generic First Process of the invention described above, the diol 'b' corresponds to component (iii); the diacid 'd' corresponds to optional component (ii); the itaconic acid corresponds to component (i); and the DOPO corresponds to component (iv). The specific Examples 1 to 5 (examples of First Polymers of the invention) were prepared by the above described generic First Process with reference to Table 1 below.

Example 6

Phosphorus Containing Polycarboxylic Acid Terminated Polyester (=First Polymer)

A process for preparing a phosphorus containing reactive (polycarboxy terminated) polyester oligomer (=First Polymer) is now described. To a suitable reaction vessel 1,256 g of 1,3 benzene dicarboxylic acid (isophthalic acid); 471.8 g of 2-methenyl-1,4-butanedioic acid (itaconic acid); and 1,061 g of 2,2-dimethyl-1,3-propanediol (neopentyl glycol) were admixed together with 0.25% of the tin polycondensation catalyst available from Goldschimdt under the trade name Fascat 4102. The reaction mixture was heated to a temperature of 235° C. When the reaction mixture became limpid a reduced pressure was gradually applied to the vessel and maintained until following characteristics were met: acid number: 42.5±2 mg KOH/g; and hydroxyl number: <4 mg KOH/g to form a polycondensation product which was then reacted directly with 784.1 g of DOPO which was added at a temperature of 200° C. The reaction mixture is then stirred for minimum of four hours at 200° C. to complete the addition reaction until the following characteristics were met: acid number: 35±3 mg KOH/g to give as product a phosphorus containing polycarboxylic acid terminated polyester. The reactive polymer precursor of Example 6 herein can be used directly in Example 14 to make a UV curable polyester useful in powder coating applications.

The Second Process and Second Polymers of the present invention will now be illustrated.

Examples 7 to 11

A generic Second Process for preparing a phosphorus containing polyester acrylate polymer precursor (=Second Polymer) is now described To a 1.5 liter double jacketed reactor vessel connected to an oil bath and equipped with a stirrer, was added 'a' g of the phosphorus containing reactive polyester oligomer (made as described in Example 'b'); 'c' g toluene; 'd' g propenoic acid (acrylic acid); 'e' g of 4-methylphenyl sulphonic acid monohydrate (p-toluenesulphonic acid monohydrate or PTSA. H$_2$O) and 'f' g of 4-methoxyphenol (mono methylether

TABLE 1

| Ex | Diol wt 'a' / g | Diol 'b' | Diacid wt 'c' /g | Diacid 'd' | ITA wt 'e' / g | DOPO wt 'f' / g | H$_2$O wt 'g' / g | P wt % 'h' / % | $I_{AC}$ 'i' mg KOH/ g | $I_{OH}$ 'j' mg KOH /g |
|----|-----|-----|-----|-----|-----|-----|-----|-----|-----|-----|
| 1 | 1,323.7 | DHE | 267.8 | ADP | 905.3 | 1503.2 | 240 | 5.57 | 8.2 | 108.2 |
| 2 | 1612.3 | TPG | 267.8 | ADP | 905.3 | 1503.2 | 240 | 5.39 | 11.25 | 25.75 |
| 3 | 1408.2 | HD | 290.5 | IPH | 865.0 | 1436.3 | 235 | 5.53 | 5.09 | 70.16 |
| 4 | 896.6 | HD | 0 | None | 790.3 | 1313.1 | 235 | 6.78 | 6.2 | 53.6 |
| 5 | 1067.0 | HD | 193.4 | ADP | 653.9 | 1085.7 | 180 | 5.39 | 9.2 | 71.4 |

In Table 1: DHE denotes 1,2-dihydroxy ethane (ethylene glycol); TPG denotes tripropylene glycol; HD denotes 1,6-hexane diol; ADP denotes 1,6-hexanedioic acid (adipic acid); IPH denotes 1,3-benzene dicarboxylic acid (isophthalic acid); and ITA denotes 2-methenyl-1,4-butanedioic acid (itaconic acid.

hydroquinone or MEHQ—an antioxidant). The reaction mixture was stirred and heated under reflux until no more water is distilled.

The reaction mixture was cooled down to 50° C. and diluted with 'g' g of toluene. The reaction mixture was washed 3 times with 15% aqueous solution of sodium sulphate (10% by volume related to the organic phase) and the organic phase was recovered and heated to 85° C. in the presence of 'h' g of 4-methoxyphenol. Water was then removed by azeotropic distillation under reduced pressure. Once no more water separated, the organic mixture was filtered at 50° C. under pressure (6 bar). The same amount of additional 4-methoxyphenol ('h' g) and 'i' g of tris(para-nonylphenyl)phosphite (TNPP, CAS no. 26523-78-4, an antioxidant stabiliser) was added to the filtrate and the mixture was heated to 85° C. and toluene was removed by distillation under reduced pressure. When all the toluene had been removed 'j' g of 1,4-dihydroxybenzene (hydroquinone or HQ—an anti-oxidant) was added to stabilise the resulting product.

Optionally the p-toluenesulphonic acid (PTSA) catalyst may be removed by precipitating it from the product using suitable base "k" (which may be a weak or a strong base) in which case an aqueous washing step is avoided which increases the yield of the highly hydrophillic product. However if a base is not used the product was simply washed with a 20% aqueous solution of $Na_2SO_4$.

In either case a phosphorus containing polyester acrylate polymer precursor was obtained which determined to have the following properties: the phosphorus content of 'l'% w/w; Hoppler viscosity (H, 60° C.) of 'm' mPa.s; colour measured following the Gardner method of 'n' G; acid value ($I_{AC}$) of 'o' mg KOH/g: and a hydroxy value ($I_{OH}$) of 'p' mg KOH/g.

Examples 7 to 11 (examples of Second Polymers of the Invention) were prepared by the above described generic Second Process with reference to Tables 2 and 3 below.

A coating composition was prepared by diluting 70 parts of Example 7 with. 30 parts of tripropylene glycol diacrylate (also referred to herein as TPGDA); 4 parts of a photoinitiator (that available commercially from Ciba under the trade name Irgacure 500); and 5 parts of an amine co-activator (that available commercially from UCB Chemicals under the trade name Ebecryl 7100). The composition was applied to a 230 mm×1050 mm substrate of MDF (8 mm thick) with a beech veneer (1 mm thick) with a roller coater and cured with UV radiation (80 W, Hg lamp) to form a film of 2×50 micron thickness which was tested as follows.

Radiant Flooring Panel Test

The coated substrate was tested in a standard radiant flooring panel test (as described in standard prEN 9239-1). The distance of flame spread was 30 cm with a critical radiant flux of 0.75 $Wcm^{-2}$. As a comparison a prior art aliphatic urethane acrylate coating (that available from UCB Chemicals under the trade designation EB 284) was applied to the same substrate with the same thickness and gave in the same test a flame spread of 42 cm with a critical radiant flux of 0.50 $Wcm^{-2}$.

Vertical Radiant Panel Test

The coated substrate was tested in a flame extinguish test (as described in standard CSE RF 3/77) and the results are given below, where for comparison the results for the same substrate uncoated are also given in parentheses. The time for the flame to extinguish was 1,053 seconds (>1,100 s); rate of flame spread (mm/min) was 29.63 seconds (30.3 s); and extent (maximum length) of damage was 520 mm (higher than 600 mm).

TABLE 2

| Ex | Wt $1^{st}$ Polymer 'a' / g | $1^{st}$ Polymer 'b' / Ex | Tol wt 'c' /g | AA wt 'd' / g | $PTSA.H_2O$ wt 'e' / g | MEHQ wt 'f' / g | Tol wt 'g' / g | MeHQ wt 'h' / g | TNPP wt 'i' / g |
|---|---|---|---|---|---|---|---|---|---|
| 7 | 500 | 1 | 245 | 72.1 | 8.58 | 1.22 | 191.0 | 0.48 | 0 |
| 8 | 750 | 3 | 346 | 74.6 | 17.3 | 1.73 | 478.6 | 0.58 | 2.3 |
| 9 | 750 | 4 | 529 | 56.9 | 19.8 | 1.98 | 277.9 | 0.66 | 2.65 |
| 10 | 750 | 5 | 538 | 75.7 | 20.2 | 2.02 | 287.7 | 0.67 | 2.69 |
| 11 | 750 | 5 | 538 | 75.7 | 20.2 | 2.02 | None | 0.67 | 2.69 |

TABLE 3

| Ex (cont.) | HQ wt 'j' / g | Base 'k' | P wt % 'l' / % | H (60° C.) 'm' / mPas | Colour 'n' / G | $I_{AC}$ - 'o' mg KOH / g | $I_{OH}$ - 'p' mg KOH / g |
|---|---|---|---|---|---|---|---|
| 7 | 0.12 | None | 5.1 | 17,250 | 1.5 | 10 | 20 |
| 8 | 0.23 | HMDA | 5.1 | NM | NM | 15 | 27 |
| 9 | 0.26 | HMDA | 6.4 | NM | NM | <15 | <15 |
| 10 | 0.27 | HMDA | 5.0 | NM | NM | <15 | <15 |
| 11 | 0.27 | NaOH 50% aq | 5.0 | NM | NM | 8.7 | 15.7 |

In Tables 2 and 3: Tol denotes toluene; AA denotes acrylic acid; PISA.$H_2O$ denotes p-toluenesulphonic acid monohydrate; MEHQ denotes 4-methoxyphenol (mono methylether hydroquinone); TNPP denotes trisnonylphenylphosphite; HQ denotes 1,4-dihydroxybenzene (hydroquinone); HMDA denotes 1,6-hexamethylenediamine; and NM indicates the property was not measured.

Flame Retardancy Tests

The flame retardant properties of various coatings and/or films made from a phosphorus containing polyester acrylate polymer precursor of the invention (Example 7) were assessed by several conventional methods as follows.

Limiting Oxygen Index (LOI) and Thermogravimetric Analysis (TGA)

A further coating composition was prepared by diluting 70 parts of Example 7 with 30 parts of TPGDA. The composition was applied to a substrate with a bar coater and cured with electron beam radiation (5 Mrad, 250 keV, 20 m/min) to form a film of 100 micron thickness which was denoted as F7.

F7 was submitted to a thermogravimetric analysis (TGA) in which the sample was heated at a rate of 10° C./min under air atmosphere from room temperature up to 700° C. The weight % residues at 500° C. and at 600° C. in the TGA test described herein for the polyester acrylate of the invention herein (Example 7) was compared with a non phosphorous containing film made from a prior art urethane acrylate (EB 284) alone. At a given temperature, a higher char yield indicated that the material is a better flame retardant. The oxygen index (OI) was determined by using ASTM D 2863 for measuring the minimum oxygen concentration to support candle-like combustion of plastics. The test was applied to material of thickness 150 μm, using a test specimen of dimensions of 52 mm×140 mm.

Following the publication of M. Levin, S. M. Atlas, Eli M. Pearce, "Flame-Retardant Polymeric Materials", Eds., Plenum Press, New-York (1975), p.376; a sample that has a Limit Oxygen Index (referred to herein as LOI) measured as described herein which is higher than 20% is considered to be a flame retardant, either a slow burning composition (20%<LOI<27%) or a self extinguishing composition (LOI>27%). It can be seen from the data in Table 4 that the Example of the present invention tested can thus considered to be flame retardants by this definition.

The char yields and LOI of a phosphorus containing polyester acrylate of the present invention can be compared with the char yields and LOI of a prior art urethane acrylate. The data in Table 4 show that compared to prior art material, char yields and/or LOI are much higher for films of the present invention than the comparative example, illustrating the improved flame retardant properties of the phosphorous containing polyester acrylates of the invention.

TABLE 4

| Example | Char Yield (%) @ 500° C. | Char Yield (%) @ 600° C. | P % (w/w) | LOI % |
|---|---|---|---|---|
| EB 284 | 11 | 1 | 0 | 18.0 |
| F7 | 30 | 21 | 3.3 | 22.6 |

Example 12

Alternative Preparation of Polymer with Structure of Example 8 (=Second Polymer)

A Second Polymer of the invention having the same structure as Example 8 herein, may solubilised as follows. To a double jacketed reactor of 0.5 liter connected to an oil bath and equipped with a stirrer were added 100 g of toluene and 200 g of the phosphorus containing reactive polyester oligomer of Example 8 (made analogously to the generic method described above and in Tables 2 & 3, the polymer having 1.63 meq DOPO/g). The reaction mixture was stirred and heated to 30° C. Then 7.6 g of sodium hydroxide in solution in 7.6 g water was slowly added to the reaction mixture. When the pH became neutral, 100 g of water was added and the reaction mixture was stirred for 10 minutes. The water phase, containing the water-soluble polyester acrylate, was decanted. $^{31}$P-NMR analysis of the water phase showed appearance of a new major peak (24.5–23.2 ppm) corresponding to the phosphinic sodium salt formed from hydrolysed DOPO).

Example 13

Phosphorus Containing Polyester Urethane Acrylate (=Second Polymer)

A phosphorus containing polyester urethane acrylate polymer precursor of the present invention was prepared as follows. To a one liter double jacketed reactor vessel connected to an oil bath and equipped with a stirrer, was added 404 g of the phosphorus containing diol (prepared analogously as described in Example 1, with an acid value of 108.2 mg KOH/g), 173.2 g of isophoronediisocyanate (IPDI) and 0.76 g of 1,4-dihydroxybenzene (hydroquinone—an anti-oxidant). The reaction mixture was stirred and heated to 70° C. Then 0.1 g of dibutyltindilaurate (DBTL, $(C_4H_9)_2Sn(OOC_{11}H_{23})_2$) was added and the reaction mixture was stirred until the isocyanate value was lower than 1.35 meq/g. 1,6-hexanedioldiacrylate (HDDA) (254 g) was then added to lower the viscosity. The reaction mixture was cooled down to 60° C. and a mixture of 2-hydroxyethylacrylate (90.5 g) and dibutyltindilaurate (0.1 g) were added dropwise through a dropping funnel over a period of 30 minutes. After the exothermic reaction was completed, the reaction mixture was heated to 90° C. and stirred until the isocyanate value was lower than 0.15%. The mixture was then cooled down, and hydroquinone (0.76 g) and TNPP (0.76 g) were added to stabilise the resultant product which was a phosphorus containing urethane acrylate with the following properties: Hoppler viscosity (H, 60° C.)=9200 mPa.s and colour measured following the Gardner method <1 G and residual NCO <0.15%.

Example 14

Preparation of a Phosphorus Containing UV Curable Glycidylated Polyester Useful in Powder Coating Applications (=Second Polymer)

The product of Example 6 (a phosphorus containing polycarboxylic acid terminated polyester) was used directly in the following process to prepare a UV curable glycidylated polyester useful in powder coating applications. Air was added to the direct product of Example 6 at a temperature between 160° C. and 170° C. and 0.5% ethyl triphenyl phosphonium bromide (calculated on total amount of resin) and 1.2% di-tert-butyl-hydroquinone (calculated on the amount of glycidyl methacrylate) were added in the reaction mixture. After that, 95% of the

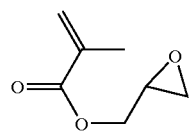

theoretical amount of glycidylmethacrylate, (GMA) recalculated on the practical acid number of Example 6, was gradually added In a time of a half-hour. The reaction mixture was then stirred for another two hours at 170° C. until following characteristics were met: acid number ≦2 mg KOH/g to form a phosphorous containing polyester which can be used in UV curable powder coating formulations.

Flame Retardancy Test

The flame retardant properties of a powder coating made from the preceding phosphorus containing glycidylated polyester of Example 14 were assessed as follows.

A powder coating composition was prepared by adding to 71.5 parts (by weight) of the polyester of Example 14; 25 parts Kronos 2160, 2.5 parts of photoinitiator (1 to 1 mixture of those available commercially from Ciba under the trade names Irgacure 2959 & Irgacure 819); and 1.0 parts of a flow additive (that available commercially from Worlée under the trade name Resiflow RV5). The composition was extruded through a double screw extruder (24 to 1 ratio of length to diameter) at a temperature of 80° C. and torque of 80% and the extrudate was pre-ground and fine milled to a suitable particle size.

The powder composition was applied to a substrate of MDF (8 mm thick) with a beech veneer (0.5 mm thick) with a corona gun (GEMA) to form a coating 70 microns thick. The coating was melted by a combination of IRM and convention at 110° C. and then cured with UV radiation (a gallium doped Hg lamp and a Hg lamp 160 Wcm$^{-1}$) at a speed of 3 m(min)$^{-1}$.

A 10 cm×10 cm sample of the coated substrate was tested in a cone calorimeter test (as described in standard ISO 5660 at a flux level of 19 kWm$^{-2}$) where the rate of heat release (in kWm$^{-2}$) was recorded as a function of time. The results are given below, where for comparison the results for the same substrate coated with the same thickness of a known white, textured, powder coating (that available commercially from UCB Chemicals under the trade name Uvecoat 2100) are also given in parentheses. The ignition time was 340 seconds (293 s) and the peak of heat release was 175 kWm$^{-2}$ at 384 seconds (224 kWm$^{-2}$ at 326 seconds).

Example 15

Incorporation of a Phosphorous Containing Polyester into an UV-Crosslinkable Polyurethane Dispersion To a double jacketed reaction vessel, connected to an oil bath and equipped with a stirrer, were added 277.0 g of the phosphorous-containing reactive polyester oligomer (prepared analogously to that described in Example 1), 52.6 g of dimethylolpropionic acid (DMPA), 264.0 g of acetone, 286.9 g of dicyclohexylmethylenediisocyanate (H$_{12}$MDI available from Bayer under the trade name Desmodur W) and 88 mg of dibutyltindilaurate (DBTL). The reaction mixture was stirred and heated at 60° C. until an isocyanate value of 0.98 meq/g was obtained Then 60.1 g of 2-hydroxyethylacrylate (HEA) and 188 mg of methyletherhydroquinone (MEHQ) were added and the reaction was stirred at 60° C. until an isocyanate value of 0.37 meq/g was obtained at which point the reaction mixture was cooled down to 45° C. Then 40.0 g of triethylamine (TEA) were slowly added to the reaction mixture. The TEA was allowed to react for 15 minutes with the free carboxylic acid groups coming from the DMPA, thus providing the polyurethane-acrylate with ionic character.

Meanwhile a double-jacketed dispersion vessel, connected also to an oil bath and provided with a stirrer, was charged with 1273 g of distilled water. Then the content of the reaction vessel was slowly discharged into the dispersion vessel under a high stirring rate to form a dispersion. After the discharge was complete, stirring was continued for half an hour. Then the dispersion vessel was heated and the acetone removed by vacuum assisted distillation at a mass temperature of 50° C. to 60° C. until the acetone content was lower than 0.15%. Then the dispersion vessel was cooled down to room temperature and the dry matter content of the dispersion adjusted to 35% by adding a calculated amount of distilled water. Finally 1.96 g of Acticide AS fungicide was added to obtain as product a dispersion with the following properties: viscosity of 29 mPa.s (measured on Brookfield viscometer at 25° C. with spindle 2 at 50 RPM); dry matter content of 35.1%. The product was tack free after the water had evaporated from the dispersion.

What is claimed is:

1. A process for preparing a phosphorus-containing polymer precursor which polymer precursor is substantially halogen-free and is a radiation-curable polyester, the process comprising the steps of
   (a) mixing together:
      (i) a compound containing at least one hydrocarbylidenically unsaturated group and a plurality of carbonyloxy groups;
      (ii) optionally a compound having a plurality of carbonyloxy groups and optionally free of hydrocarbylidenically unsaturated groups,
      (iii) a polyol, and
      (iv) an oxyphosphorous-containing compound (component (iv)) in which the phosphorous atom has at least one P—C bond which is resistant to hydrolysis or transesterification under the reaction conditions herein; such component (iv) comprising compounds of formula (I) and/or (II) and/or effective isomers, salts and mixtures thereof:

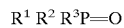

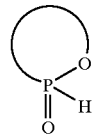

where,
in formula (I): at least R$^1$ and R$^2$ independently represents C$_{1-20}$organo group substituted by one or more hydroxy and/or carboxy group; R$^3$ represents H or optionally substituted C$_{1-20}$organo group;
in formula (II): the phosphorous atom is substituted with at least one carbon atom to form at least one P—C bond; the P—O bond forms part of an organo ring, the ring being optionally substituted with one or more organo groups and/or optionally fused to one or more other organo rings;
   (b) initiating polymerisation of the mixture to form a hydroxy and/or carboxy terminated phosphorous containing polyester oligomer ("First Polymer"),
   (c) reacting the First Polymer with at least one acrylating agent to form a radiation-curable polymer precursor ("Second Polymer").

2. A process as claimed in claim 1, in which a catalyst is present during step (a) which catalyst (component (v)) comprises a tin complex catalyst.

3. A process as claimed in claim 1, wherein the oxyphosphorous-containing compound of formula (I) comprises at least one of:
   bis(hydroxymethyl)isobutylphosphineoxide, bis(hydroxypropyl)isobutylphosphine oxide and trishydroxymethylphosphine oxide.

4. A process as claimed any claim 1, wherein the oxyphosphorous-containing compound of formula (II) comprises:

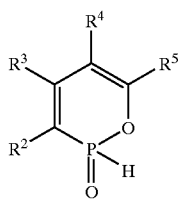

Formula (IIa)

in which

R² to R⁵ independently represent H or optionally substituted $C_{1-18}$ organo group(s), a plurality of which may together represent one or more rings optionally fused to the oxyphosphorous ring to which they are attached.

5. A process as claimed in claim 1, wherein the oxyphosphorous-containing compound of formula (II) comprises:

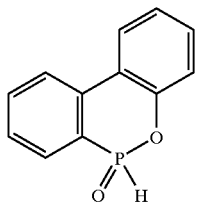

Formula (IIb)

9,10-dihydro-9-oxa-10-phosphaphenantrene-10-oxide.

6. A process as claimed in claim 1, which comprises a further step (step (d)) where the reaction product is neutralised with a base and water is removed from the reaction mixture before the resultant product is isolated.

7. A process as claimed in claim 1, wherein the "First Polymer" is reacted with an oxiranating and/or isocyanating agent.

8. A polymer obtained or obtainable from the process as claimed in claim 1.

9. A polymer as claimed in claim 8 comprising optionally substituted phosphorous containing polyester urethane (meth)acrylates.

10. A process comprising a polymerisation method for preparing a phosphorus-containing polyester derived polymer by initiating polymerisation in the presence of the polymer as claimed in claim 8, and which optionally may be used as a reagent, and/or co-monomer in combination with other ingredients selected from (co)monomers, polymer precursors, catalysts, initiators, cross-linkers, flame retardant additives and/or other additives.

11. A polymer ("Third Polymer") obtained or obtainable from the process as claimed in claim 10.

* * * * *